US012603865B2

(12) United States Patent
Spillman

(10) Patent No.: US 12,603,865 B2
(45) Date of Patent: Apr. 14, 2026

(54) SYSTEMS AND METHODS FOR REMOTE ACCESS LATENCY REDUCTION

(71) Applicant: MASTERCARD INTERNATIONAL INCORPORATED, Purchase, NY (US)

(72) Inventor: Gregory T. Spillman, De Soto, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 261 days.

(21) Appl. No.: 18/136,841

(22) Filed: Apr. 19, 2023

(65) Prior Publication Data

US 2024/0356901 A1    Oct. 24, 2024

(51) Int. Cl.
*H04L 29/00*        (2006.01)
*H04L 9/40*        (2022.01)

(52) U.S. Cl.
CPC ........ *H04L 63/029* (2013.01); *H04L 63/0218* (2013.01); *H04L 63/0236* (2013.01)

(58) Field of Classification Search
CPC ............... H04L 63/029; H04L 63/0218; H04L 63/0236
USPC ......................................................... 726/11
See application file for complete search history.

(56) References Cited

U.S. PATENT DOCUMENTS 11,470,182 B1 * 10/2022 Virtser ................... H04L 67/56
2023/0108139 A1 * 4/2023 Bhupalam ........... H04L 61/5076
726/11

* cited by examiner

*Primary Examiner* — Brandon Hoffman
*Assistant Examiner* — Michael D Anderson
(74) *Attorney, Agent, or Firm* — Harness, Dickey & Pierce, P.L.C.

(57)        ABSTRACT

Systems and methods are provided for use in providing remote access across multiple regions. One example method includes receiving a remote access request from a user terminal associated with a remote user, where the request is specific to a first data center of a network, and opening, by a front-end firewall, a first IP security (IPSec) tunnel with the user terminal. The method also includes forwarding, by the front-end firewall, the request to a distribution firewall and routing, by the distribution firewall, the request to a back-end firewall, which is specific to the first data center. The method then further includes opening, by the back-end firewall, a second IPSec tunnel with the network and forwarding the request, through the second IPSec tunnel, to the network to thereby support communication between the user terminal and the network, via the first and second IPSec tunnels.

12 Claims, 3 Drawing Sheets

SYSTEMS AND METHODS FOR REMOTE ACCESS LATENCY REDUCTION

FIELD

The present disclosure generally relates to systems and methods for use in reducing latency in providing remote access to one or more data centers, for users, through a cloud platform, in communication with the one or more data centers.

BACKGROUND

This section provides background information related to the present disclosure which is not necessarily prior art.

Remote access is common in various computer systems, to enable access to a company at a variety of physical locations, often outside of a company facility.

In one specific remote access scheme, a corporate network includes data organized into different data centers, for example, and various other resources (e.g., remote access hosts, etc.) to be accessed by remote users. In various examples, the data centers are organized into different physical locations, and more generally different regions. For example, a North America region may include two different data centers in two different cities, while an Asia Pacific region may include multiple data centers in different countries. As part of the corporate network, each of the data centers is associated with or includes a firewall, which imposes policies for access to the data centers. The firewalls are, in general, in the specific regions and/or at the sites of the data centers. In the example above, each of the listed cities in North America include a firewall, and so do the data centers in the countries.

In the above example, the corporate network is accessible through a cloud platform, which includes processing and physical memory, and specifically, allocations for individual firewalls, which communicate with the firewalls of the corporate network, via IP security (IPSec) tunnels. The IPSec tunnels extend from each of the firewalls in the cloud platform (i.e., back-end firewalls) to the respective ones of the corporate network firewalls.

Also, the cloud platform includes firewalls to terminate IPSec tunnels, which are opened in connection with remote clients (i.e., front-end firewalls). In particular, various users may request remote access to the corporate network, via the cloud platform, through a remote client, at a user terminal (e.g., a laptop, a computer, etc.).

In connection therewith, the user requests access at the user terminal, whereby the remote client (in the user terminal) authenticates the user and accesses an IPSec tunnel to the cloud platform, and specifically, a front-end firewall of the region in which the user is located. The front-end firewall terminates the communication, and forwards the access request to a back-end firewall or to the Internet, as applicable. The front-end firewall, in doing so, enforces appropriate policies related to the access. The back-end firewall, upon receipt of the access request, then determines a data center associated with the user access, and either directs the access to the corporate network firewall, if in the same region, or to another different back-end firewall in another different region, which, in turn, directs the access back to the data center, via the corporate network firewall. Likewise, the back-end firewall, in providing access, also enforces appropriate policies related to the access.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Remote access schemes may extend across multiple different regions, whereby data centers and other resources are located in the different regions. To protect the different data centers, the remote access is provided through a cloud platform, as describe above with front-end and back-end firewalls. As the amount of remote access traffic associated with the data centers builds in the cloud platform, along with the demand for remote access (i.e., limited or minimal latency), the back-end firewalls are overloaded with traffic associated with both providing in-region access back to the corporate network and then also routing out-region access to the different, other regional back-end firewalls. The additional load of routing the traffic to out-region back-end firewalls causes latency in operations of the back-end firewall, which results in degraded remote access performance and/or data center access. The back-end firewalls may be duplicated to expand the available resources to address the added load of both implementing the policies of the firewall and routing of the out-region access request. The additional back-end firewalls, however, provide added resource allocation and complexity, which is not desirable.

Uniquely, the systems and methods herein include a distribution firewall disposed between front-end and back-end firewalls, in the cloud platform, per region, to offload the routing of out-region access requests from the back-end firewall. In this manner, load associated with the routing of out-region access requests at the back-end firewalls is reduced or eliminated, thereby enhancing performance of the cloud platform as a whole, and specifically, the back-end firewalls, while reducing latency (e.g., even with the additional firewall therebetween, etc.) and resource utilization (e.g., fewer back-end firewalls, etc.).

Figure 1:
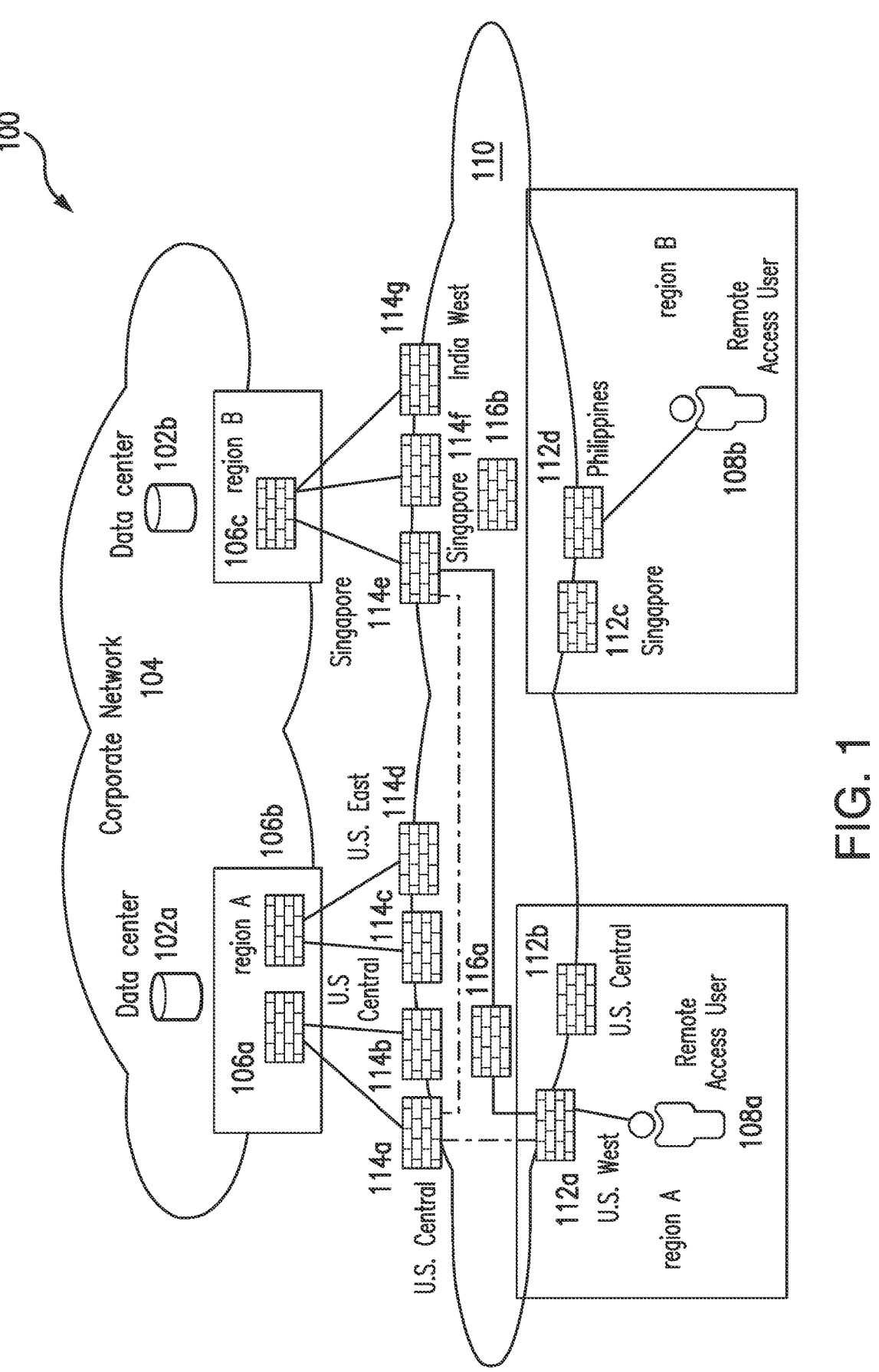
FIG. 1 is a block diagram of an example system of the present disclosure suitable for use in providing remote access to data centers of a network, which are situated in different regions, through a cloud platform with designated distribution firewalls.

FIG. 1 illustrates an example system 100, in which the one or more aspects of the present disclosure may be implemented. Although the system 100 is presented in one arrangement, other embodiments may include the parts of the system 100 (or other parts) arranged otherwise depending on, for example, services associated with data included therein and/or associated region, regulations, etc.

As shown in FIG. 1, the system 100 generally includes two regions, region A and region B. In this example embodiment, the regions are geographically distinct. As such, region A may include the United States, or North America, and region B may include Germany, or Europe. The regions may include sub-regions, which are smaller parts of the regions. For example, North America may be one region, which includes U.S. South, U.S. Central, Mexico, Canada, and U.S. West sub-regions. It should be appreciated that various additional regions may be included in other system embodiments.

As shown, the system 100 includes two data centers 102, with data center 102a located in region A and data center 102b located in region B. The data centers 102 form part of a corporate network 104 associated with an entity, where the corporate network 104 is shown as the cloud symbol in FIG. 1. The data centers 102 may include various different types of data, and may further include services, accessible via remote access. The corporate network 104, in turn, includes one or more remote access hosts, which configure the corporate network 104 to support remote access between one or more users and the data centers 102. To that end, the corporate network 104 includes multiple corporate firewalls 106, including corporate firewalls 106a-c located in region A and region B, as shown.

Further, the system 100 includes two remote users 108, including remote user 108a located in region A and remote user 108b located in region B. Each of the users 108 is associated with a user terminal (not shown), such as, for example, a laptop, a computer, a tablet, etc. In general, the users 108 may further be associated with the entity (e.g., a corporation, division, agency, company, business, partnership, etc.) in charge of the corporate network 104, for example, as employees, contractors, or service providers, whereby access to the data centers 102 may be appropriate in the course of the user's interactions with the entity. For example, the user 108a may include an employee of the entity, who is responsible for generating analytics related to data stored in the data centers 102. In this example, access to the data centers 102, remotely, is within the scope of the employment of the user 108a. Other examples include, without limitation, access associated with: job tasks as pertains to the specific roles of the remote users 108 (e.g., finance, human resources, security, business services, infrastructure services, etc.); personal tasks (e.g., employee and/or human resources related tasks, such as, for example, time management tools, retirement management tools, personal financial planning, etc.); and volunteer management tasks/tools, (e.g., planning, tracking and attending community volunteer opportunities, etc.) It should be appreciated that various other relationships and/or tasks may exist between the corporate network 104 and the users 108 and/or associated with remote access requests, whereby access is appropriate and desired.

It should be appreciated that various other data centers may be included in regions A and/or B, or in still other regions, and also that other remote users may be located in regions A and/or B, or in still other regions, in various other system embodiments.

In this example embodiment, the corporate network 104 is configured to support remote access, for the remote users 108, to the data centers 102, via a cloud platform 110. The cloud platform 110 is configured to support communication between the users 108 and the data centers 102, and potentially, other network participants, such as, for example, Internet content services/providers (e.g., websites, APIs, transfer hubs, hosted services, etc.), cloud service providers (e.g., AZURE by MICROSOFT CORP., AWS by AMAZON CORP., etc.), etc.

As illustrated in FIG. 1, the cloud platform 110, in connection with the regions A and B, may be generally understood to be located in both regions A and B, whereby physical cloud resources in one or both of region A and region B form the cloud platform 110 across the multiple regions.

In connection with the above, the cloud platform 110 is configured to enforce certain policies, either defined by the cloud platform 110 or the corporate network 104. The policies may relate to access, content, data logging, etc., which may be universal or location specific. In this example embodiment, the cloud platform 110 includes various firewalls 112, 114 to enforce the associated policies. The firewalls, in this embodiment, include one or more virtual machines, which are located and/or hosted in the cloud platform 110 (e.g., which may include and/or be defined in GOOGLE Cloud Services, AMAZON Web Services, MICROSOFT AZURE, etc., platforms, etc.). In this manner, the firewalls as represented in FIG. 1 each include allocated physical hardware, which is configured and operates as described herein.

In this example embodiment, the firewalls 112 are each configured as a user aggregation firewall. In this example, therefore, the firewalls are each configured to terminate remote access tunnels (with the terminals of remote users) (e.g., as Internet facing anchor points, etc.) and to enforce policies associated with the cloud platform 110 and/or the corporate network 104. In addition, the firewalls 112 are each configured to route traffic to/from one or more distribution firewalls 116a-b (as described below) from/to terminals of the remote users 108 (i.e., ingress/egress traffic), and also to route Internet traffic associated with the remote users 108 to various web servers, as appropriate.

Further, in this example embodiment, the firewalls 114 are each configured as a data center access firewall. In this example, therefore, the firewalls 114 are each configured to terminate one or more tunnels with the corporate network 104 and to enforce policies associated with the corporate network 104 (e.g., data center access policies, etc.) (e.g., by supporting, for example, least privileged access, etc.). In addition, the firewalls 114 each are configured to route traffic to/from the one or more distribution firewalls 116a-b from/to the corporate network 104 (i.e., ingress/egress traffic) (e.g., exclusive traffic routing between the cloud platform 110 and the corporate network 104, etc.).

As shown in FIG. 1, the firewalls 112, 114 of the cloud platform 110 are generally designated as front-end firewalls (relative to the remote users 108), which are references 112a-d, and back-end firewalls (again, relative to the remote users 108), which are referenced 114a-g. In particular, in this embodiment, the back-end firewalls 114 are on the corporate network 104 "side" of the cloud platform 110, and each back-end firewall 114 is associated with a particular sub-region within the respective regions A and B. For example, back-end firewall 114a is located within the U.S. Central sub-region of region A. Further, in this embodiment, the front-end firewalls 112 are on the user 108 "side" of the cloud platform 110, and each front-end firewall 112 is associated with a particular sub-region within the respective regions A and B. In one example, the front-end firewall 112b is located in sub-region U.S. Central; the front-end firewall 112c is located in sub-region Singapore and the front-end firewall 112d is located in sub-region Philippines. Similarly, again, the back-end firewalls 114a-d are located in the sub-regions: U.S. West, U.S. Central, U.S. South and U.S. East, and the back-end firewalls 114c-g are located in the sub-regions: Singapore, Philippines and India West.

As noted above, the front-end and back-end designations are stated relative from the remote user(s) 108 back toward the corporate network 104. Other terms or designations may be used in other examples to differentiate, if not describe, ones of the firewalls versus other ones of the firewalls.

It should also be appreciated that various other different firewalls may be included in the same or different locations in other embodiments. For example, as should be understood, the number and/or distribution of cloud platform firewalls may be dependent on the coverage of the remote access (e.g., a number of regions and sub-regions, etc.) and a volume of traffic associated with the access, etc. As shown in FIG. 1, for example, the cloud platform 110 includes two back-end firewalls 114a, 114b, which are both specific to the U.S. Central sub-region based on the volume of anticipated and/or existing traffic associated therewith. The other firewalls depicted in FIG. 1 are likewise provided and/or included in the cloud platform 110 based on above criteria, etc.

In this example embodiment, terminals of the remote users 108 and the front-end firewalls 112, and also the back-end firewalls 114 and the corporate network 104, are configured to be connected through one or more tunnels, and specifically, IP security (IPSec) tunnels, to provide a path for communication therebetween. That said, it should be appreciated that other different types of tunnels may be employed in other system embodiments. It should be appreciated that in one or more embodiments, the transport layer security (TLS) may be used in lieu of IPSec tunnels, while still other appropriate channels/tunnels may be employed in still other embodiments. In addition, the cloud platform 110 and other aspects of the system 100 are configured consistent with the Border Gateway Protocol (BGP) protocol, whereby communication therein (e.g., request, traffic, etc.) is in compliance with the specific protocol. That said, other suitable protocols may be included in other system embodiments.

In this example embodiment, the system 100, uniquely, includes two distribution firewalls 116a-b, which are part of the cloud platform 110. The distribution firewalls 116a-b are configured to route traffic associated with remote access, from the front-end firewalls 112 to the back-end firewalls 114, and vice versa. In particular, in a conventional scheme, the back-end firewalls 114 are required to distribute traffic associated with a different data center, or region of a corporate network, between ones of the firewalls 114, which is essentially "east-west" in the cloud platform to the appropriate other ones of the back-end firewalls 114 before being routed back to the corporate network 104. This routing is illustrated in the dotted lines in FIG. 1 (between the back-end firewall 114a and 114c). Depending, for example, on the types of traffic, times of days, volumes of traffic, the conventional scheme imposes significant load on the back-end firewalls 114, which, in turn, ultimately reduces performance and/or throughput, and/or increases latency of the traffic therethrough.

However, in this example embodiment, the distribution firewalls 116a-b are disposed to eliminate load associated with east-west routing between ones of the back-end firewalls 114. In particular, the distribution firewalls 116 each are configured to provide the "east-west" routing of traffic and to distribute remote access traffic between the front-end firewalls 112 and the back-end firewalls 114, and in particular, to/from specific regions A, B and/or data centers 102 of the corporate network 104 (e.g., based on the best advertised path of the destination network, etc.)

Each distribution firewall 116 is further configured to participate in a dynamic routing relationship with other distribution firewalls 116, and also the front-end firewalls 112 and back-end firewalls 114. The distribution firewalls 116 are also configured to provide for routing prefixes, which are received, and also transmitted to other distribution firewalls 116, while creating a loop free environment (e.g., a reliable multiple path network including resiliency and sufficient bandwidth, etc.). Notably, however, in this example embodiment, the distribution firewalls 116 are not configured to terminate remote access tunnels, to enforce Internet policies (e.g., traffic and content filtering, intrusion detection and prevention, malicious traffic inspection, etc.), and/or to enforce policies associated with access to the data centers 102.

Similarly, in this example embodiment, neither the front-end firewalls 112 nor the back-end firewalls 114 are configured to participate in a dynamic routing relationship with other ones of the front-end firewalls 112 and/or the back-end firewalls 114, or forwarding traffic directly to other ones of the front-end firewalls 112 or the back-end firewalls 114. Accordingly, in FIG. 1, the back-end firewalls 114 are not required, or potentially configured, to direct traffic to other back-end firewalls, thereby eliminating load and/or latency associated with this specific routing.

As such, when the remote user 108a, for example, requests remote access to the data center 102b, the user terminal (not shown) of the remote user 108a interacts with the front-end firewall 112a (in this example). In turn, the front-end firewall 112a is configured to enforce the appropriate policies for the remote access. This may include, for example, authenticating the remote user 108a and, based on successful authentication, opening the IPSec tunnel between the terminal and the front-end firewall 112a, through which traffic is permitted to flow into the cloud platform 110. The front-end firewall 112a is configured in this manner to be a terminal point for the IPSec tunnel and to pass the traffic to the distribution firewall 116a, as shown in the solid line of FIG. 1. The front-end firewall 112a includes a routing entry for the distribution firewall 116a, and not any of the back-end firewalls 114, whereby the front-end firewall 112a is merely configured to forward traffic to/from the remote access users from/to the distribution firewall 116a. This is contrary to a conventional scheme, in which the traffic is routed directly to the back-end firewalls 114a, for example, as shown in the dotted line in FIG. 1.

The distribution firewall 116a, in turn, is configured to determine a destination of the traffic, based on one or more rules associated with the remote access request and the regions to which the remote access request is directed. For example, where the remote access request includes a request to access the data center 102b, the distribution firewall 116a is configured to identify the one of the back-end firewalls 114 associated with that data center 102b, which is the back-end firewall 114c, in this example, as the destination. The routing rules may be implemented in specific routing tables, whereby the routing entries define routing. The routing entries include, for example, both preferred and non-preferred routing entries to access associated data centers (but not routing entries to access the front-end firewalls 112). In one example, the routing entry for the back-end firewall 114c is associated with access to the data center 102b, while the routing entry for the back-end firewall 114f is a non-preferred routing entry. Consistent therewith, the distribution firewall 116a is further configured to then route the remote access request to the back-end firewall 114e (in the absence of failure of the back-end firewall 114c, or to the back-end firewall 114f based on a failure of the back-end firewall 114c), in this example.

Also, it should be appreciated that, in this example, the back-end firewall 114*c* includes routing entries from the data center 102*b* and also the distribution firewall 116, and not any of the front-end firewalls 112, whereby the back-end firewall 114*e* is merely configured to forward traffic to/from the data center 102*b* from/to the distribution firewall 116. Again, this is contrary to a conventional scheme, in which the traffic is routed to the front-end firewalls 112 (either directly or through another back-end firewall 114), for example, as shown in the dotted line in FIG. 1.

In this embodiment, the back-end firewall 114*e* is configured to enforce the appropriate policies for the remote access request, whereby it is configured to open the IPSec tunnel with the corporate firewall 106*c* of the corporate network 104 (in region B, in which the data center 102*b* is located). Similarly, the corporate firewall 106*c* is configured to enforce the appropriate policies for the remote access, and upon successful compliance, grant the remote access request, whereby remote access is provided, via the various firewalls 106*c*, 112*a*, and 114*e* and tunnels between the terminal of the remote user 108*a* and the data center 102*b*. That is, the front-end firewall 112*a*, the distribution firewall 116*a*, and the back-end firewall 114*e* are configured to support communication between the user terminal and the network, via the respective tunnels.

It should be appreciated that like the above, if the remote user 108*a* requests access to the data center 102*a*, the distribution firewall 116*a* is configured similarly and directs the remote access request to the back-end firewall 114*a* or 114*b*.

It should be further appreciated that the distribution firewalls 116*a-b* are configured consistently (whereby the distribution firewall 116*b* is configured consistent with the above description), in order to pass a specific request and then to route and/or direct traffic, associated with the remote access, between the front-end firewalls 112 and the back-end firewalls 114 (each of which is similarly configured consistent with the above description). As such, routing imposed by the distribution firewalls 116*a-b* alleviates the load and/or latency of the forwarding of traffic between different ones of the back-end firewalls 114.

Figure 2:
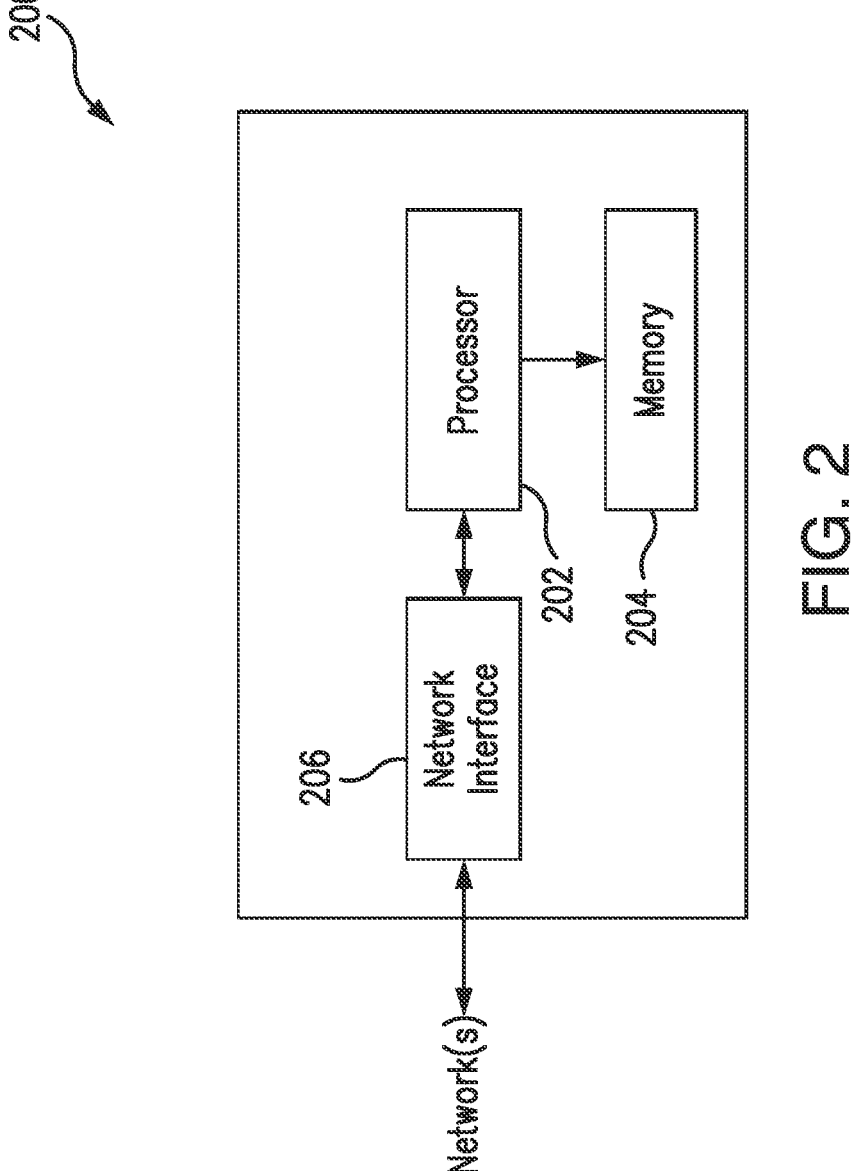
FIG. 2 is a block diagram of a computing device that may be used in the example system of FIG. 1.

FIG. 2 illustrates an example computing device 200 that can be used in the system 100. The computing device 200 may include, for example, one or more servers, workstations, computers, laptops, POS devices, ATMs, etc. In addition, the computing device 200 may include a single computing device, or it may include multiple computing devices located in close proximity or distributed over a geographic region, so long as the computing devices are configured to function as described herein. In the system 100, the data centers 102, the firewalls 106, 112, and 114 and the routing engines 116 each may include, or be implemented in one or more cloud-based computing devices which is/are generally consistent with the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, any suitable data and/or types of data (and/or data structures) for use as described herein. Furthermore, in various embodiments, computer-executable instructions, i.e., software instructions, may be stored in the memory 204 for execution by the processor 202 to cause the processor 202 to perform one or more of the operations described herein (e.g., of the method 300, etc.), such that the memory 204 is a physical, tangible, and non-transitory computer readable storage media. Such instructions often improve the efficiencies and/or performance of the processor 202 that is performing one or more of the various operations herein, whereby in performing the operations the computing device 200 is transformed into a special purpose computing device. In addition, one or more load files may be stored in memory 204, which includes hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204). The network interface 206 may include, without limitation, a wired network adapter, a wireless network adapter, a mobile network adapter, or other device capable of communicating to one or more different networks, for example, as included in the system 100. Further, in some example embodiments, the computing device 200 includes the processor 202 and one or more network interfaces 206 incorporated into or with the processor 202.

Figure 3:
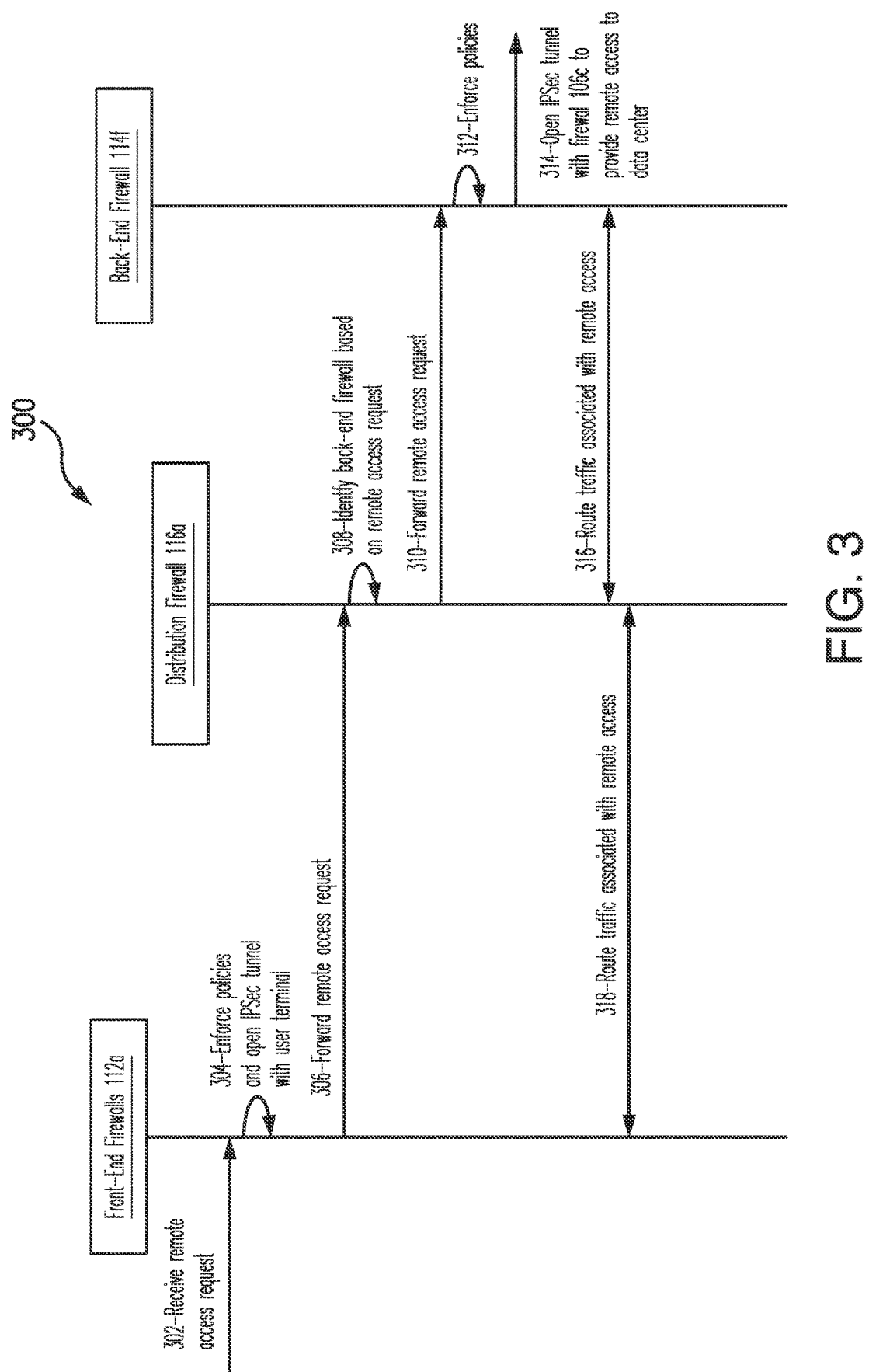
FIG. 3 is an example method, which may be implemented in connection with the system of FIG. 1, for use in providing remote access, through a distribution firewall.

FIG. 3 illustrates an example method 300 for use in providing remote access. The method 300 is described with reference to cloud platform 110 and the corporate network 104, and further with reference to the system 100 and the computing device 200. While described in this manner, it should also be appreciated that the methods herein are not limited to the system 100 and computing device 200, and that the systems and computing device herein are similarly not limited to the method 300.

At the outset, at 302, a remote access request is received, at the front-end firewall 112*a*, from a terminal associated with the remote user 108*a*, through which the remote user 108*a* is to access the data center 102*b*, for example. At 304, the front-end firewall 112*a* enforces one or more policies associated with the remote access, and then, opens an IPSec tunnel between the front-end firewall 112*a* and the user's terminal. The one or more policies may include, for example, authentication of the remote user 108*a* (e.g., credential login, biometric authentication, two-factor authentication, etc.). Other policies may include, without limitation, Internet edge polices (e.g., intrusion detection and prevention, SSL decryption and inspection, malware detection and removal, data loss prevention, etc.), etc.

Based on the policy enforcement, at 306, the front-end firewall 114a then forwards the remote access request to the distribution firewall 116a, which is located in the same region as the front-end firewall 112a. In doing so, the front-end firewall 112a identifies the distribution firewall 116a based on routing tables included therein, consistent with the BGP protocol and managed by the distribution firewall 116a-b, whereby each incoming remote access request to the front-end firewall 112a is forwarded to the distribution firewall 116a. It should be noted that in other examples, the remote access request may be forwarded to a different distribution firewall based on the routing tables, one or more rules, and/or load balancing associated therein, or otherwise.

At 308, the distribution firewall 116a receives the remote access request and identifies the back-end firewall 114 to which the access request is directed. This may include identifying, based on content of the remote access request and/or associated routing entries (e.g., the distribution firewall 116a includes routing entries based on content of the request (e.g., indicative by region, user, policies, etc.), etc.), etc., the specific data center to which the access is requested. In this example, based on one or more network routes (preferred or non-preferred) (or rules indicative of the same), the distribution firewall 116a identifies the back-end firewall 114f (located in Singapore). At 310, based on the above, the distribution firewall 116a forwards the remote access request to the back-end firewall 114f.

In turn, the back-end firewall 114f enforces, at 312, one or more policies associated with the corporate network 104, for example. The one or more policies may include access determinations for the authenticated remoter user, for example.

When the policies are enforced (and satisfied), the back-end firewall 114f opens an IPsec tunnel with the corporate firewall 106b (associated with the data center 102b to which the request is directed) and then provides the remote access request to the corporate firewall 106b, at 314. It should be appreciated that the corporate firewall 106b may enforce one or more additional policies, or impose filtering, etc., in addition to the one or more policies enforced by the back-end firewall 114f.

Once the policies are satisfied for the remote access, at 316, the back-end firewall 114f and the distribution firewall 116a cooperate to route remote access traffic (consistent with one or more policies) therebetween. Similarly, at 318, the distribution firewall 116a and the front-end firewall 112a cooperate to route remote access traffic (consistent with one or more policies) therebetween.

In this manner, tunnel connection is provided for remote access between the user terminal of the remote user 108a and the data center 102b (through the front-end firewall 112a, the distribution firewall 116a, the back-end firewall 114f and the corporate firewall 106b), whereby the remote user 108a is permitted to access data from the data center 102b as necessary to perform one or more tasks associated with the access. That is, the front-end firewall 112a, the distribution firewall 116a, and the back-end firewall 114e are supporting communication between the user terminal and the network, via the respective tunnels, thereby permitting data, which is consistent with the enforced, associated policies, to be exchanged between the user terminal associated with the remote access user 108a and the data center 102b included in the cooperate network 104 (via the corporate firewall 106c).

In view of the above, the distribution firewalls being disposed between the front-end firewalls and the back-end firewalls, in the cloud platform, per region, permit "cast-west" or out-region routing to be offloaded from the back-end firewall. As such, load associated with out-region routing at the back-end firewalls is reduced or eliminated, thereby enhancing performance of the cloud platform as a whole, and specifically, the back-end firewalls, while reducing latency and resource utilization. What's more, the implementation of the distribution firewall(s) in the cloud platform, with the front-end firewalls and the back-end firewalls may permit the entity associated with the remote access to assemble the different firewalls based on certain criteria, for example, including defined by performance metric(s), redundancy policies, maintenance and/or failover policies and/or requirements, with the ability to review and revise as necessary to alter the cloud-based implementation of the same based on the criteria cited above.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) receiving a remote access request from a user terminal associated with a remote user, the remote access request specific to a first data center of a network; (b) opening, by a front-end firewall, a first IP security (IPSec) tunnel with the user terminal associated with the remote access request; (c) forwarding, by the front-end firewall, the remote access request to a distribution firewall; (d) routing, by the distribution firewall, the remote access request to one of multiple back-end firewalls, which is specific to the first data center; (e) opening, by the one of the multiple back-end firewalls, a second IPSec tunnel with the network and forwarding the remote access request, through the second IPSec tunnel, to the network; (f) supporting communication between the user terminal and the network, via the first and second IPSec tunnels; (g) enforcing, by the front-end firewall, at least one policy, on the remote access request, prior to opening the first IPSec tunnel; and/or (h) enforcing, by the one or the multiple back-end firewalls, at least one policy, on the remote access request, prior to opening the second IPSec tunnel.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in providing remote access across multiple regions, the system comprising:

a cloud platform including multiple front-end firewalls, multiple back-end firewalls, and at least one distribution firewall disposed in communication between the multiple front-end firewalls and the multiple back-end firewalls;

wherein each of the multiple front-end firewalls is associated with a different subregion of the multiple regions, and is configured to:

receive a remote access request from a user terminal associated with a remote user, the remote access request specific to a first data center of a corporate network;

enforce one or more policies for the remote access request; and upon conformance with the one or more policies, open a first IP security (IPSec) tunnel with a terminal associated with the remote access request and forward the remote access request to the at least one distribution firewall; and wherein the at least one distribution firewall is configured to receive the remote access request from the front-end firewall and to route the remote access request from the front-end firewall to one of the multiple back-end firewalls, which is specific to the first data center; and wherein the one of the multiple back-end firewalls is configured to:

enforce one or more further policies associated with the remote access request; and upon conformance with the one or more further policies, open a second IPSec tunnel with the corporate network and forward the remote access request, through the second IPSec tunnel, to the corporate network, whereby remote access is provided to the user terminal through the first and second IPSec tunnels.

2. The system of claim 1, wherein each of the multiple back-end firewalls is associated with one of the different subregions of the multiple regions; and wherein the multiple regions include geographical regions.

3. The system of claim 2, wherein the one or more policies includes authentication of the remote user associated with the remote access request.

4. The system of claim 1, wherein each of the multiple back-end firewalls is not configured to forward traffic to a different one of the multiple back-end firewalls.

5. The system of claim 1, wherein the one of the multiple front-end firewalls, the at least one distribution firewall, and the one of the multiple back-end firewalls are configured to support communication between the user terminal and the corporate network, via the first and second IPSec tunnels.

6. The system of claim 5, wherein the corporate network includes a corporate firewall; and wherein the one of the multiple back-end firewalls is configured to open the second IPSec tunnel with the corporate firewall of the corporate network.

7. The system of claim 6, wherein the corporate network includes the first data center in communication with the corporate firewall; and wherein the communication is between the user terminal and the data center.

8. The system of claim 7, wherein the multiple front-end firewalls, the at least one distribution firewall, and the one of the multiple back-end firewalls are included in a single cloud platform.

9. A computer-implemented method for use in providing remote access across multiple regions, the method comprising:

receiving, by one of multiple front-end firewalls of a cloud platform, a remote access request from a user terminal associated with a remote user, the remote access request specific to a first data center of a corporate network, each of the multiple front-end firewalls associated with a different subregion of the multiple regions;

enforcing, by the one of the multiple front-end firewalls, one or more policies for the remote access request; and upon conformance with the one or more policies:

opening, by the one of the multiple front-end firewalls, a first IP security (IPSec) tunnel with a terminal associated with the remote access request; and forwarding, by the one of the multiple front-end firewalls, the remote access request to a distribution firewall of the cloud platform; and receiving, by the distribution firewall of the cloud platform, the remote access request from the one of the multiple front-end firewalls, the distribution firewall disposed in communication between the multiple front-end firewalls and multiple back-end firewalls of the cloud platform;

routing, by the distribution firewall, the remote access request from the one of the multiple front-end firewalls to one of the multiple back-end firewalls of the cloud platform, which is specific to the first data center;

enforcing, by the one of the multiple back-end firewalls, one or more further policies associated with the remote access request; and upon conformance with the one or more further policies:

opening, by the one of the multiple back-end firewalls, a second IPSec tunnel with the corporate network; and forwarding, by the one of the multiple back-end firewalls, the remote access request, through the second IPSec tunnel, to the corporate network, whereby remote access is provided to the user terminal through the first and second IPSec tunnels.

10. The computer-implemented method of claim 9, wherein each of the multiple back-end firewalls is associated with one of the different subregions of the multiple regions; and wherein the multiple regions include geographical regions.

11. The computer-implemented method of claim 9, wherein the one or more policies includes authentication of the remote user associated with the remote access request.

12. The computer-implemented method of claim 9, wherein the corporate network includes a corporate firewall; and wherein opening, by the one of the multiple back-end firewalls, the second IPSec tunnel with the corporate network includes opening the second IPSec tunnel with the corporate firewall of the corporate network.

* * * * *